Patented Nov. 26, 1935

2,022,361

UNITED STATES PATENT OFFICE 2,022,361

PROCESS OF PRODUCING A REFINED HYDROGENATED SESAME OIL

Guy W. Phelps and Raymond Bradley, Chicago, Ill., assignors to Industrial Patents Corporation, Chicago, Ill., a corporation of Delaware No Drawing. Application February 7, 1933, Serial No. 655,679

4 Claims. (Cl. 87—12)

This invention relates to a method of treating sesame seed oil. One of the objects of the present invention is to prepare hydrogenated sesame seed oil that will not darken when heated. Other objects will be apparent from the description which follows.

Hydrogenated sesame seed oil, although often used in shortening compounds, is undesirable as an ingredient in shortening compounds used for deep frying and the like, due to the fact that hydrogenated sesame seed oil has a tendency to darken when it is heated.

In the treatment of oils and fats for the manufacture of shortening, it is customary to hydrogenate some of the more liquid oils in order to stiffen the body and to produce the proper consistency of the final product. Before hydrogenation, it is customary to first refine the oil by treatment with a caustic soda solution and to remove the water and soap stocks formed by the caustic refining. This is always done prior to the hydrogenation step of the process since the impurities and free fatty acids normally present in the crude oil have a serious inhibiting effect on the hydrogenation process. The usual treatment of the more liquid oils for use in shortening consists, therefore, of a series of steps, including caustic refining, separation of the water and foots, filtering, hydrogenation, deodorization and chilling, in this order.

When sesame seed oil is treated by this series of steps, a shortening product of a very desirable color is formed. However, if the shortening product so formed is used in any process which requires continued heating, the fat develops a very undesirable color, ranging from pink and purple to nearly black, depending upon the source of the raw sesame seed oil and the amount of heating to which it is subjected in use.

The present invention overcomes this objectionable quality in shortening made in whole or in part of hydrogenated sesame seed oil and contemplates the introduction of a second caustic refining treatment at a particular stage in the treating process. In carrying out the present invention, the crude sesame seed oil is treated with caustic in the usual way. The water and foots are then separated and the oil filtered and hydrogenated, after which the hydrogenated sesame seed oil is washed with a small amount of caustic solution, whereby the impurities which have been produced in the oil during hydrogenation are precipitated and carried out of the oil.

In practice we have secured satisfactory results by using as the second caustic wash for the hydrogenated oil, about two per cent by weight of the oil of 8 Baumé solution.

This second caustic treatment which we have added to the conventional treatment of sesame seed oil, hydrogenated for use in shortening, eliminates the objectional discoloration which results from the heat of ordinary hydrogenated sesame seed oil and renders sesame seed oil usable in shortening compounds to be used for frying and the like.

The term "refining", as used in the claims which follow, is defined as the treatment of oil with a caustic solution, followed by separation of the caustic solution together with the impurities which it has dissolved from the oil, it being understood that such separation may be secured by settling, centrifuging, or in any other desired manner.

We claim:

1. The method of treating sesame seed oil which comprises subjecting the sesame seed oil to a refining treatment to remove free fatty acids more or less completely therefrom and give a substantially neutral product, hydrogenating the refined sesame seed oil and thereafter washing the oil with a small amount of caustic solution insufficient to substantially saponify the oil and removing the precipitate.

2. The method of treating sesame seed oil which comprises subjecting the sesame seed oil to a refining treatment to remove the free fatty acids, hydrogenating the refined sesame seed oil and thereafter washing the oil with a small amount of caustic solution insufficient to substantially saponify the oil and removing the precipitate.

3. In the treatment of sesame seed oil, the step of washing hydrogenated sesame seed oil with a caustic solution insufficient in quantity to substantially saponify the oil and removing the precipitate.

4. The method of treating sesame seed oil which comprises treating the oil with a caustic solution, thereafter separating the caustic solution from the oil together with the impurities which it has dissolved from the oil to thereby remove free fatty acids more or less completely therefrom and give a substantially neutral product, hydrogenating the refined sesame seed oil and thereafter washing the hydrogenated sesame seed oil with a small amount of caustic solution insufficient to substantially saponify the oil and thereafter removing the precipitate.

GUY W. PHELPS.
RAYMOND BRADLEY.